United States Patent [19]
Van Kleef

[11] 3,822,869
[45] July 9, 1974

[54] LIQUID DISCHARGE MEMBER FOR LIQUID-VAPOR CONTACTING TRAY

[75] Inventor: Alfred L. Van Kleef, The Hague, Netherlands

[73] Assignee: Shell Oil Company, New York, N.Y.

[22] Filed: Feb. 5, 1973

[21] Appl. No.: 329,773

[30] Foreign Application Priority Data
Feb. 7, 1972  Great Britain ..................... 5620/72

[52] U.S. Cl. ............................................ 261/114 R
[51] Int. Cl. .............................................. B01f 3/04
[58] Field of Search ..... 261/114 R, 114 A, 114 VT, 261/114 JP, 114 TC, 110

[56] References Cited
UNITED STATES PATENTS

| | | | |
|---|---|---|---|
| 1,811,627 | 6/1931 | Heid | 261/114 R |
| 2,646,977 | 7/1953 | Kraft | 261/114 R |
| 2,698,746 | 1/1955 | Reynolds | 261/114 R |

FOREIGN PATENTS OR APPLICATIONS

| | | | |
|---|---|---|---|
| 724,635 | 12/1965 | Canada | 261/114 R |

Primary Examiner—Tim R. Miles
Assistant Examiner—Richard L. Chiesa

[57] ABSTRACT

Liquid discharge members for liquid-vapor contacting trays having vertical side walls laterally confining a narrow oblong space, which accommodates the whole or a substantial part of a baffle fitting against the long side walls and running up and down, which creates compartments A that are open at the top and compartments B that are open at the bottom, lying next to one another in the sequence A-B-A-, of which the compartments A are provided with one or more discharge openings.

18 Claims, 4 Drawing Figures

LIQUID DISCHARGE MEMBER FOR LIQUID-VAPOR CONTACTING TRAY

BACKGROUND OF THE INVENTION

The present invention generally relates to a liquid discharge member for liquid-vapor contacting trays. The trays may be of the grid-, sieve-, or valve plate type and be used for such processes as distillation, absorption, stripping. The term "vapor" as here used invariably includes gas.

It is known that trays may be provided with oblong narrow basins extending partly above and partly below the tray, which basins are open at the top, while their bottom part is provided with discharge openings, which may consist of slits or round apertures and which may or may not be combined with profiled walls and/or liquid seals. The use of a plurality of oblong basins on a tray renders it possible to discharge the liquid more uniformly from a tray and supply it to the next lower tray than can be done with a sideways placed means of liquid discharge. Also, a greater weir length can then be obtained, so that operation at a higher liquid load becomes possible. Moreover, the basins serve as liquid-/vapor separators, notably for the vapor that can still flow over the edges of the basins along with the liquid. The basins may be provided with baffles in and/or above the open top as catching means for liquid. The positioning of a plurality of basins on a tray requires great care, because liquid flow patterns are greatly influenced thereby. It should also be ensured that the active surface area of the tray remains a maximum. In connection with the design of large diameter trays it is advantageous to render the basins rigid, so that no or only light supporting constructions for the tray are required.

The present invention meets the above described criteria and provides a successful solution to problems in the art, as will be apparent from the following description of the invention.

SUMMARY OF THE INVENTION

The primary purpose of this invention resides in providing a liquid discharge member for liquid-vapor contacting trays in columns utilized for distillation, absorption, stripping or the like.

The above purpose is achieved by providing contacting trays having some compartments with a trapeziform vertical cross section and alternating compartments with an isosceles triangular vertical cross section.

The present invention relates in particular to a liquid discharge member for liquid-vapor contacting trays, having vertical side walls laterally confining a narrow oblong space, which accommodates at least part of a baffle fitting against the side walls and running up and down, which creates compartments A that are open at the top and compartments B that are open at the bottom, lying next to one another in the sequence A-B-A-, of which the compartments A are provided with one or more discharge openings.

Within the framework of the above described limitations, the present invention provides numerous significant advantages as will be apparent from the description of preferred embodiments following.

DESCRIPTION OF THE DRAWINGS

In the accompanying drawings.

DESCRIPTION OF THE PREFERRED EMBODIMENTS

Figure 1:
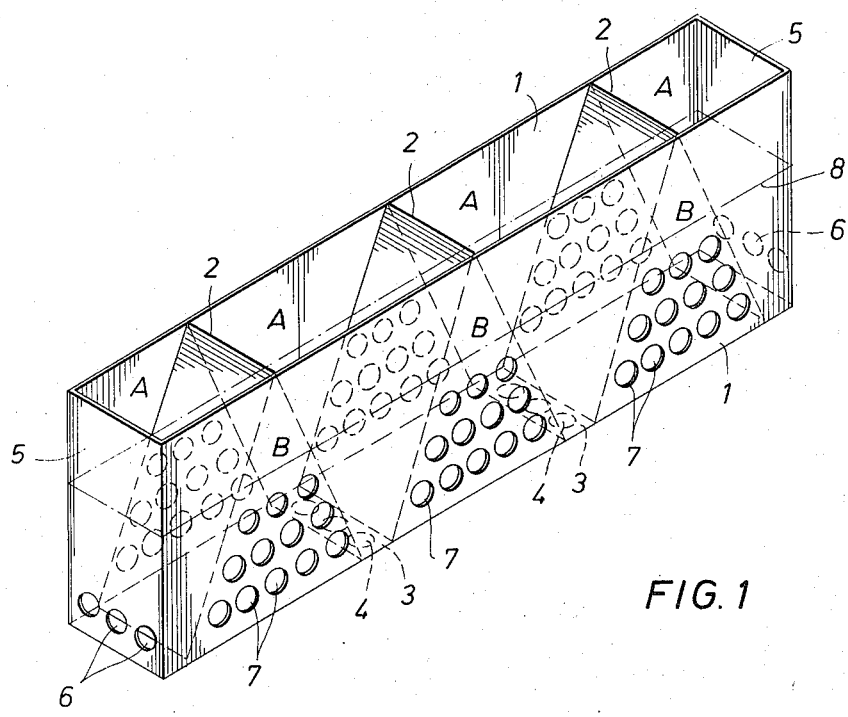
FIG. 1 is a perspective view and FIG. 2 is a vertical sectional view of liquid discharge members according to the invention.

According to the present invention, which provides a basin of great strength, a liquid discharge member for liquid-vapor contacting trays is formed by vertical side walls laterally confining a narrow oblong space which accommodates the whole or a substantial part of a baffle fitting against the long side-walls and running up and down, which creates compartments A that are open at the top and compartments B that are open at the bottom, lying next to one another in the sequence A-B-A-. . . . , of which the compartments A are provided with one or more discharge openings at or near the bottom. The baffle may be braised or welded to the upright walls.

In this manner a very rigid design is obtained, which imparts far greater strength to trays of very large diameters - up to 10 meters. The weir length remains completely available despite the fact that the liquid discharge member is divided into compartments of two kinds with different functions. The compartments A receive the liquid and discharge it to the next tray. Their open top is larger than their bottom, but the liquid supplied can still flow down readily by hydrostatic pressure. It is desirable that in this design the sum of the discharge openings amounts to a value between 1/5 and 1/3 of the open-top surface area. The compartments B can also have an important function, as will be described hereinafter.

The baffle may be undulating in shape, but should preferably run up and down in sharp folds. This promotes accurate dimensioning of the compartments. The folded baffle may be of such a design that the vertical cross section of a compartment A has the shape of an isosceles trapezium with the short parallel side at the bottom. The height of such a trapezium may equal the height of the vertical walls. A compartment A so shaped has a cross section resembling a funnel, and the liquid can readily be discharged through openings, for instance in the narrow flat bottom, and/or through openings in the rectangular side-walls of the compartment A near the narrow side of the trapezium. Under normal operating conditions, liquid will invariably be present in the compartments A, whereby the passage of vapor through the discharge openings is prevented. Alternatively, the height of the trapezium may be greater than the height of the vertical walls in such a fashion that the narrow side of the trapezium extends downwards beyond the vertical walls. Discharge openings may again be provided in the narrow flat bottom and/or in the rectangular side-walls of the compartment A near the narrow side of the trapezium. In this case, discharge in a lateral direction can also be brought about attractively if the trapeziform side-walls of the compartment A are, near the narrow side, provided with discharge openings. In fact, this may be achieved by locally extending the bottom part of the vertical side-wall.

Furthermore it is possible to give the vertical cross section of a compartment A the form of an isosceles triangle resting on its top. The discharge openings may be provided in the triangular side-walls near the top and-/or in the rectangular side-walls near the top of the triangle. In all cases the choice of the position of the discharge openings depends on the position of the discharge members of the next lower tray, because it is essential that the liquid discharged from a tray should not fall direct into a discharge member of a tray below, otherwise this liquid will hardly have any contact with the vapor.

The vertical cross section of a compartment B may have the form of an isosceles triangle with the top uppermost. The top angle may be 20°–100°. The choice of the top angle also determines the shape of the compartment A. A small top angle causes the small parallel side of the trapeziform compartment A to have relatively large dimensions. In that case, more discharge openings may be provided, which will be desirable at very high liquid loads.

The compartments B are closed at the top and open at the bottom. They contain no liquid. The side-walls of the compartments B may be provided with one or more openings in that section which extends below the tray when the liquid discharge member has been mounted. Through these openings vapor may flow, in consequence of which the vapor pressure on both sides of a liquid discharge member remains the same. This is very important, because the vapor zones between the liquid discharge members can be more or less sealed from one another by the bed of liquid and in particular by foamlike bubbles of liquid from the next lower tray. As a result, instability in the passage of liquid and vapor through a tray may ensue. This disadvantage may be particularly marked with long liquid discharge members running parallel across the entire tray. The liquid discharge members according to the invention completely eliminate the said disadvantage, the more because of the presence of the compartments B over the entire length of the liquid discharge members.

The narrow vertical side walls confining the rectangular space laterally may form part of the baffle running up and down. This design has constructional advantages. The terminal compartments so obtained may perform the function of the compartments A, that is, they may be provided with discharge openings at the bottom. These openings are preferably made in the terminal rectangular side face near the bottom. The liquid issuing therefrom is directed towards the column wall, which promotes the contact between liquid and the vapor rising along the column wall.

The liquid discharge members according to the invention are mounted on trays in such a fashion that they extend partly above and partly below the tray. As a rule, their top and bottom edges will run parallel with the tray. The liquid discharge members may have any desired length and be arranged in any desired pattern. Because of the great rigidity of the liquid discharge members, a great length has its advantage in that it contributes to strengthening of the tray.

In FIG. 1 a narrow oblong zone is confined by upright walls 1. Inside this zone there is a baffle 2 running up and down, which is fitted against walls 1, thereby creating compartments A that are open at the top and compartments B that are open at the bottom. The nonterminal compartments A have a trapeziform vertical cross section. The narrow sides 3 thereof are provided with discharge openings 4 in this instance. The terminal compartments A also have a trapeziform vertical cross section, which is not isosceles, however. The end faces 5 are provided with discharge openings 6.

The compartments B have an isosceles triangular vertical cross section. Their triangular side-walls are provided with openings 7. The line 8 indicates where the tray joins the discharge member and the holes 7 are provided in the part below the tray.

Figure 2:
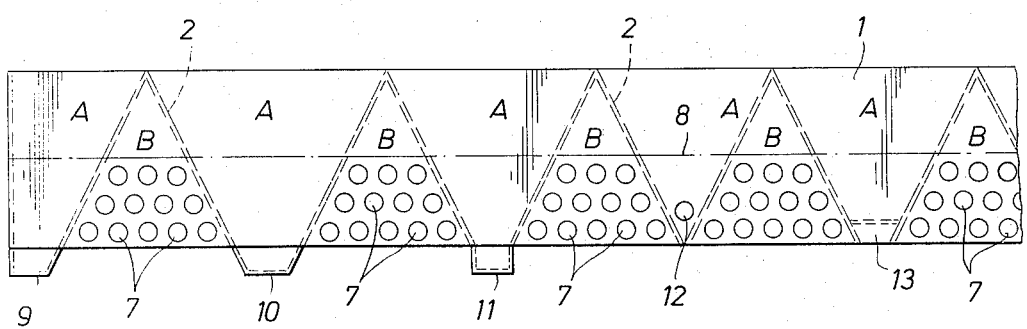

The sectional view according to FIG. 2 illustrates various embodiments of discharge members according to the present invention. Such numerals as have been used hereinbefore have the same meaning in FIG. 2 and subsequent drawings. The narrow ends 9, 10 and 11 of the compartments A may have the shapes as here shown. They extend beyond the wall 1. Discharge openings may be present in the flat bottoms and/or in the adjacent parts of the side-walls. The front and back of the projecting parts may be closed. They may also be open, however, for instance because the wall 1 has a straight bottom edge.

The compartment A may also have a triangular vertical cross section with discharge openings in the rectangular side-walls near the top of the triangle. In addition, a discharge opening 12 may be present, consisting of a perforation of the wall 1. In the case of a trapeziform cross section, a laterally directed discharge opening may also be obtained by providing an aperture as denoted by 13.

Figure 3:
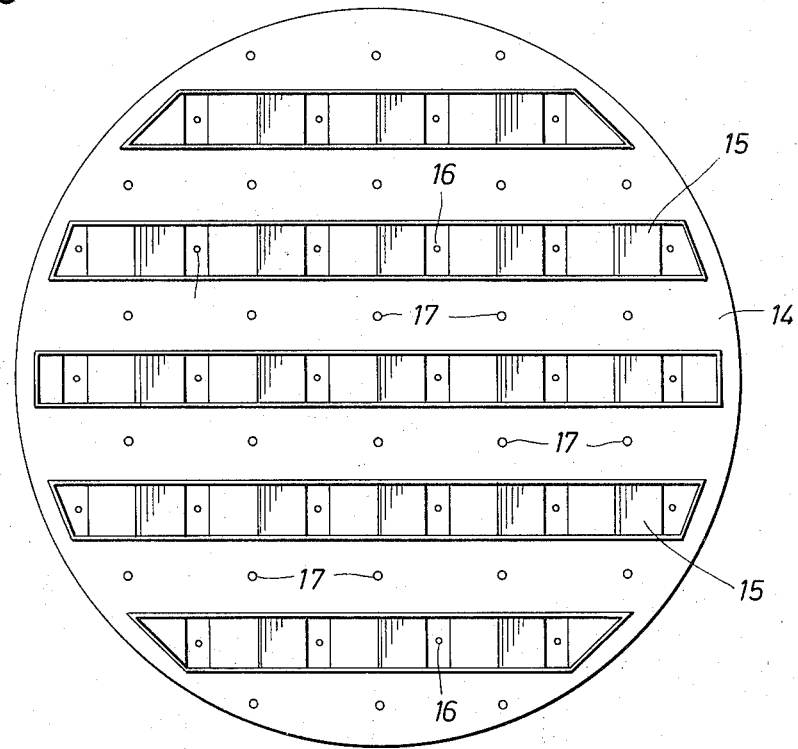
FIGS. 3 and 4 show details of a tray provided with such discharge members.

As an example of a tray layout, FIG. 3 is a top view of a tray 14, which in actual practice has a diameter of 2.5 m. There are five liquid discharge members 15 according to the invention. They have end faces which are adapted to the shape of the column wall. The width of the discharge members 15 is 200 mm, and that of the intervening tray sections is 250 mm. The liquid discharge members occupy 39 percent of the total tray surface area. A total of 19 m weir length is available, that is 3.9 m per sq.m of tray surface area. The discharge members have been designed for a liquid flow rate of 0.1 m/s at the top and of 0.5 m/s at the discharge openings. The closed dots 16 indicate the positions of the discharge openings. The next lower tray is of identical design, but oriented at 90° relative to the tray above it. The open dots 17 denote the places where the liquid falls onto the tray 14 from the next higher tray. The discharge openings are directed downwards and/or laterally.

Figure 4:
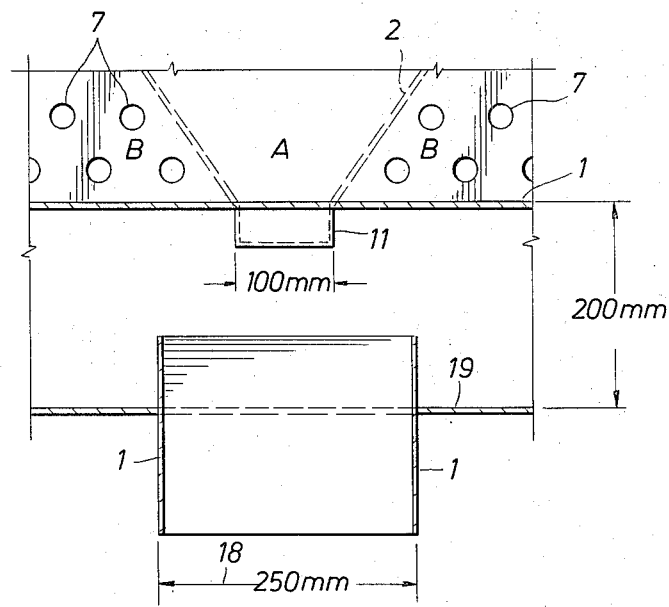

FIG. 4 is a cross sectional view of a portion of a liquid-vapor contacting tray, illustrating in detail the relative position of two discharge members lying above one another. Both are of the same type. The zone 18 represents the space 250 mm wide between two discharge members with side-walls 1. The lower tray is denoted by 19. It is situated at a distance of 200 mm from the bottom of the wall 1. The liquid from the compartment A here shown in top position is discharged vertically downwards and/or laterally in a plane perpendicular to the plane of the drawing. From tray 19 liquid flows over the edges of the walls 1 into the adjacent compartments A.

I claim as my invention:

1. A liquid discharge member for liquid-vapor contacting trays, comprising vertical side walls laterally confining a narrow oblong space, which accommodates at least part of a baffle fitting against the side walls and running up and down, which creates compartments A that are open at the top and compartments B that are open at the bottom, lying next to one another in the sequence A-B-A-, of which the compartments A are provided with one or more discharge openings.

2. A liquid discharge member according to claim 1, having a sharply folded baffle running up and down.

3. A liquid discharge member according to claim 2, wherein the vertical cross section of a compartment A has the shape of an isosceles trapezium with the short parallel at the bottom.

4. A liquid discharge member according to claim 3, wherein the height of the trapezium is equal to the height of the vertical walls.

5. A liquid discharge member according to claim 3, wherein the height of the trapezium is greater than the height of the vertical walls in such a fashion that the narrow side of the trapezium extends downwards beyond the vertical walls.

6. A liquid discharge member according to claim 3, wherein the narrow flat bottom side of the compartment A is provided with at least one discharge opening.

7. A liquid discharge member according to claim 3, wherein the trapeziform side-walls of the compartment A are, near the narrow side, provided with discharge openings.

8. A liquid discharge member according to claim 3, wherein the rectangular side-walls of the compartment A are, near the narrow side of the trapezium, provided with at least one discharge opening.

9. A liquid discharge member according to claim 2, wherein the vertical cross section of a compartment A has the shape of an isosceles triangle resting on its top.

10. A liquid discharge member according to claim 9, wherein discharge openings are present in the triangular side-walls near the top and in the rectangular side-walls near the top of the triangle.

11. A liquid discharge member according to claim 1, wherein the vertical cross section of a compartment B has the shape of an isosceles triangle with the top uppermost.

12. A liquid discharge member according to claim 11, wherein the top angle of the isosceles triangle is 20°–100°.

13. A liquid discharge member according to claim 1, wherein the side-walls of the compartments B are provided with at least one aperture in that section which extends below the tray when the liquid discharge member has been mounted on that tray.

14. A liquid discharge member according to claim 1, wherein the narrow vertical side walls confining the rectangular space laterally form part of the baffle running up and down.

15. A liquid discharge member according to claim 1, wherein the terminal compartments perform the function of the compartments A.

16. A liquid discharge member according to claim 15, wherein the terminal compartments are, near the bottom, provided with one or more discharge openings in the terminal rectangular side face.

17. A tray provided with liquid discharge members which extend partly above and partly below the tray, each discharge member comprising a liquid discharge member for liquid-vapor contacting trays, comprising vertical side walls laterally confining a narrow oblong space, which accommodates at least part of a baffle fitting against the side walls and running up and down, which creates compartments A that are open at the top and compartments B that are open at the bottom, lying next to one another in the sequence A-B-A-, of which the compartments A are provided with one or more discharge openings.

18. A column provided with trays each provided with liquid discharge members which extend partly above and partly below the tray, each discharge member comprising a liquid discharge member for liquid-vapor contacting trays, comprising vertical side walls laterally confining a narrow oblong space, which accommodates at least part of a baffle fitting against the side walls and running up and down, which creates compartments A that are open at the top and compartments B that are open at the bottom, lying next to one another in the sequence A-B-A-, of which the compartments A are provided with one or more discharge openings.

* * * * *